(12) United States Patent
Baer et al.

(10) Patent No.: US 10,549,504 B2
(45) Date of Patent: Feb. 4, 2020

(54) CONFINED CRYSTALLIZATION MULTILAYER FILMS

(75) Inventors: Eric Baer, Cleveland Heights, OH (US); Anne Hiltner, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 1028 days.

(21) Appl. No.: 12/631,964

(22) Filed: Dec. 7, 2009

(65) Prior Publication Data

US 2010/0143709 A1 Jun. 10, 2010

Related U.S. Application Data

(60) Provisional application No. 61/120,140, filed on Dec. 5, 2008.

(51) Int. Cl.
*B29C 55/12* (2006.01)
*B29C 55/04* (2006.01)
*B29C 47/06* (2006.01)
*B32B 7/02* (2019.01)

(52) U.S. Cl.
CPC ............. *B32B 7/02* (2013.01); *Y10T 428/265* (2015.01); *Y10T 428/31544* (2015.04); *Y10T 428/31725* (2015.04); *Y10T 428/31786* (2015.04); *Y10T 428/31938* (2015.04)

(58) Field of Classification Search
USPC .......................................................... 428/336
See application file for complete search history.

(56) References Cited

U.S. PATENT DOCUMENTS

| 4,430,284 | A | * | 2/1984 | Rasmussen ......... B29C 67/0003 264/173.12 |
| 5,312,689 | A | * | 5/1994 | Dasher et al. ................ 428/413 |
| 5,429,874 | A | * | 7/1995 | VanPutte ...................... 428/522 |
| 6,451,414 | B1 | * | 9/2002 | Wheatley et al. ............ 428/212 |
| 2002/0150704 | A1 | * | 10/2002 | Baer et al. .................... 428/34.2 |
| 2005/0105191 | A1 | * | 5/2005 | Baer et al. .................... 359/652 |
| 2005/0219683 | A1 | * | 10/2005 | Ohta et al. .................... 359/359 |

* cited by examiner

*Primary Examiner* — Cheng Yuan Huang
(74) *Attorney, Agent, or Firm* — Tarolli, Sundheim, Covell & Tummino LLP

(57) ABSTRACT

A multilayer film includes an extruded first polymer layer confined between extruded second polymer layers. The first polymer layer includes a high aspect ratio crystalline lamellae. The multilayer film is substantially impermeable to gas diffusion.

18 Claims, 13 Drawing Sheets

Fig. 3

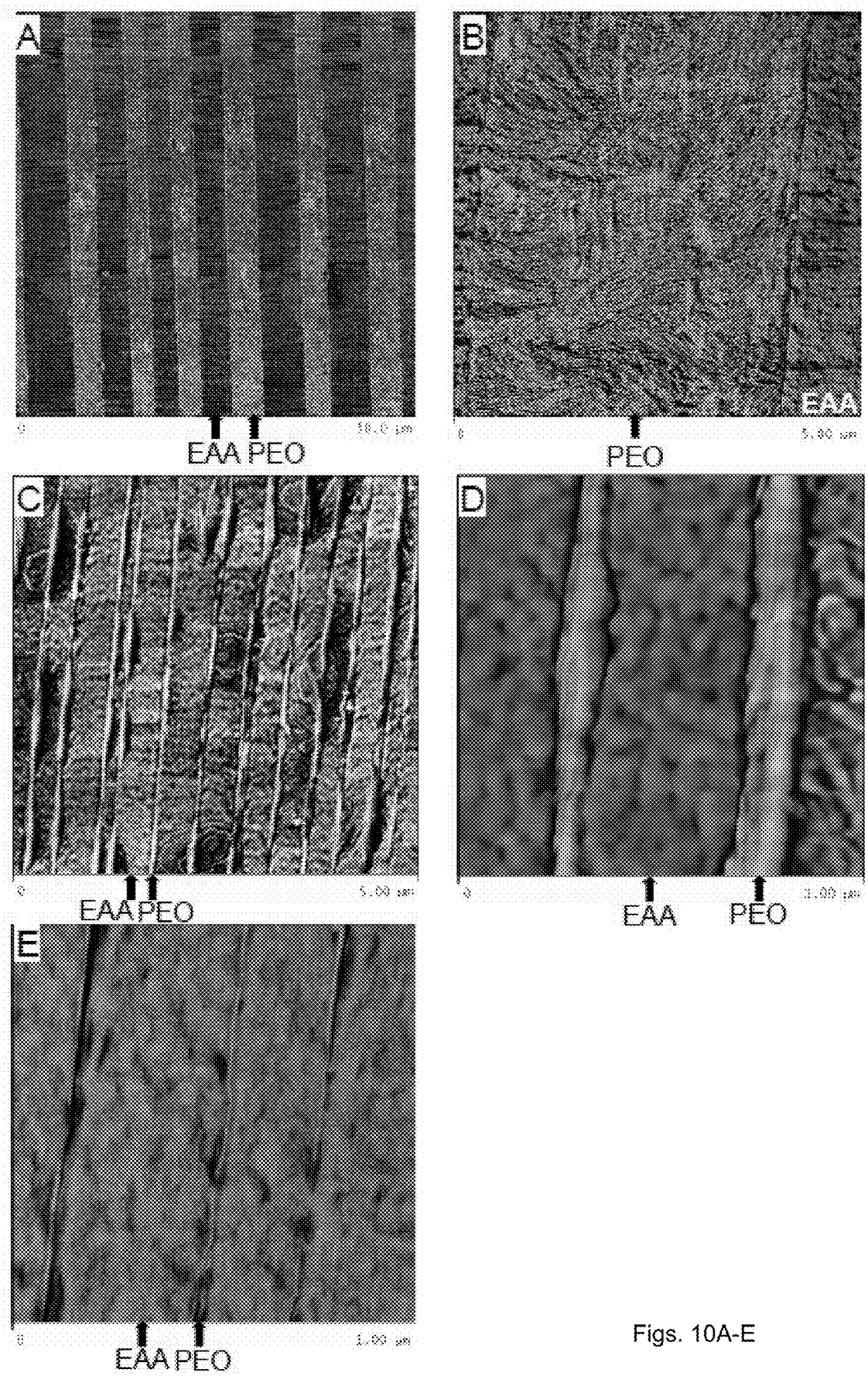
Figs. 10A-E

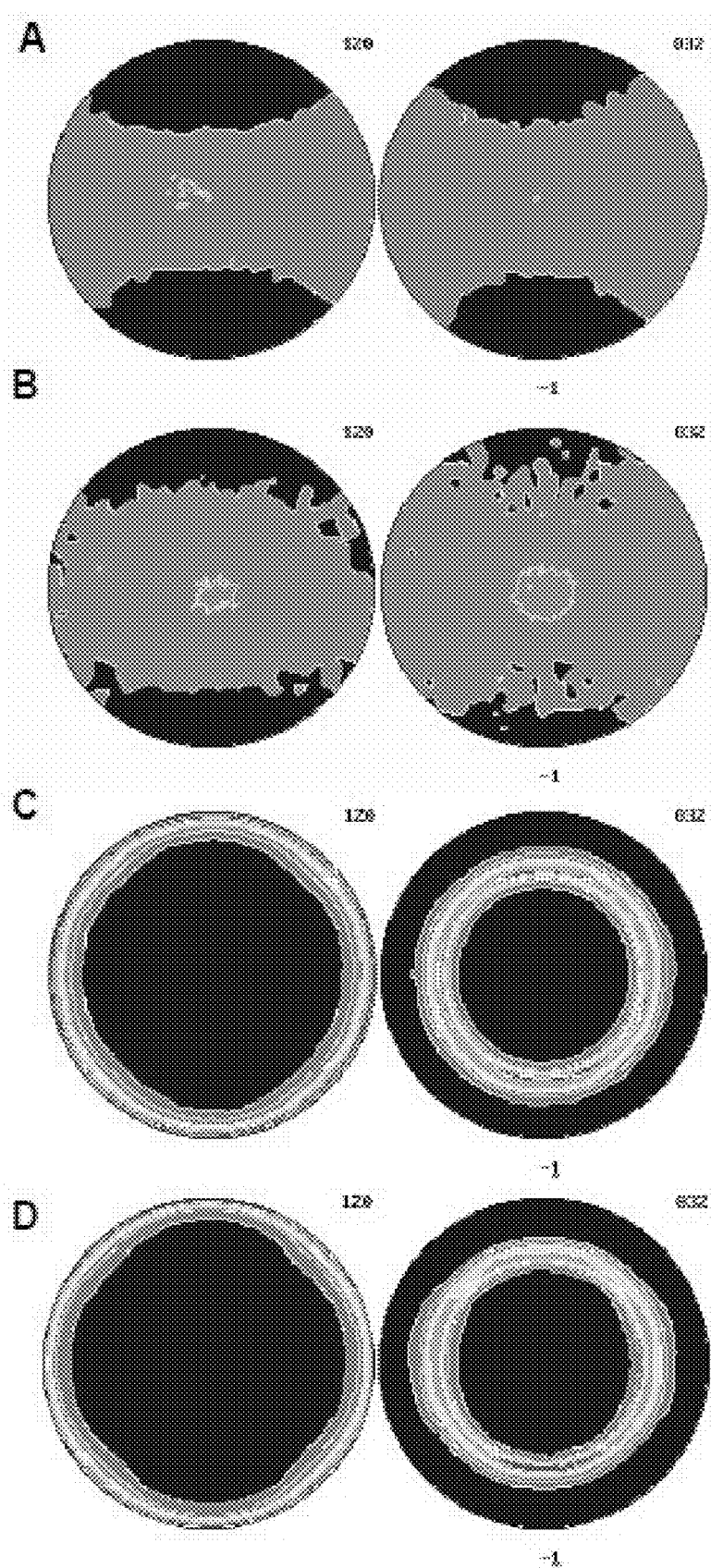
Figs. 11A-D

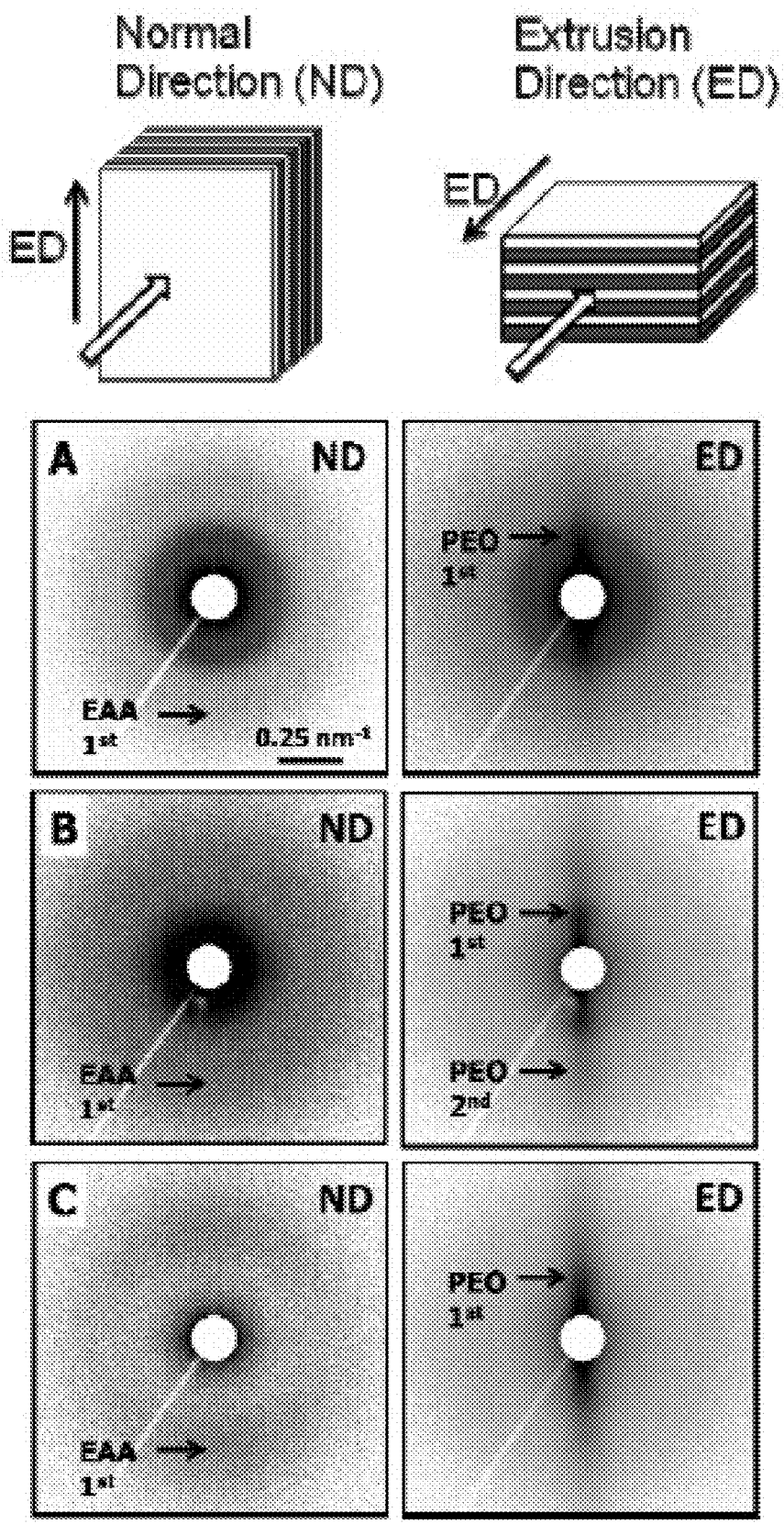
Figs. 12A-C

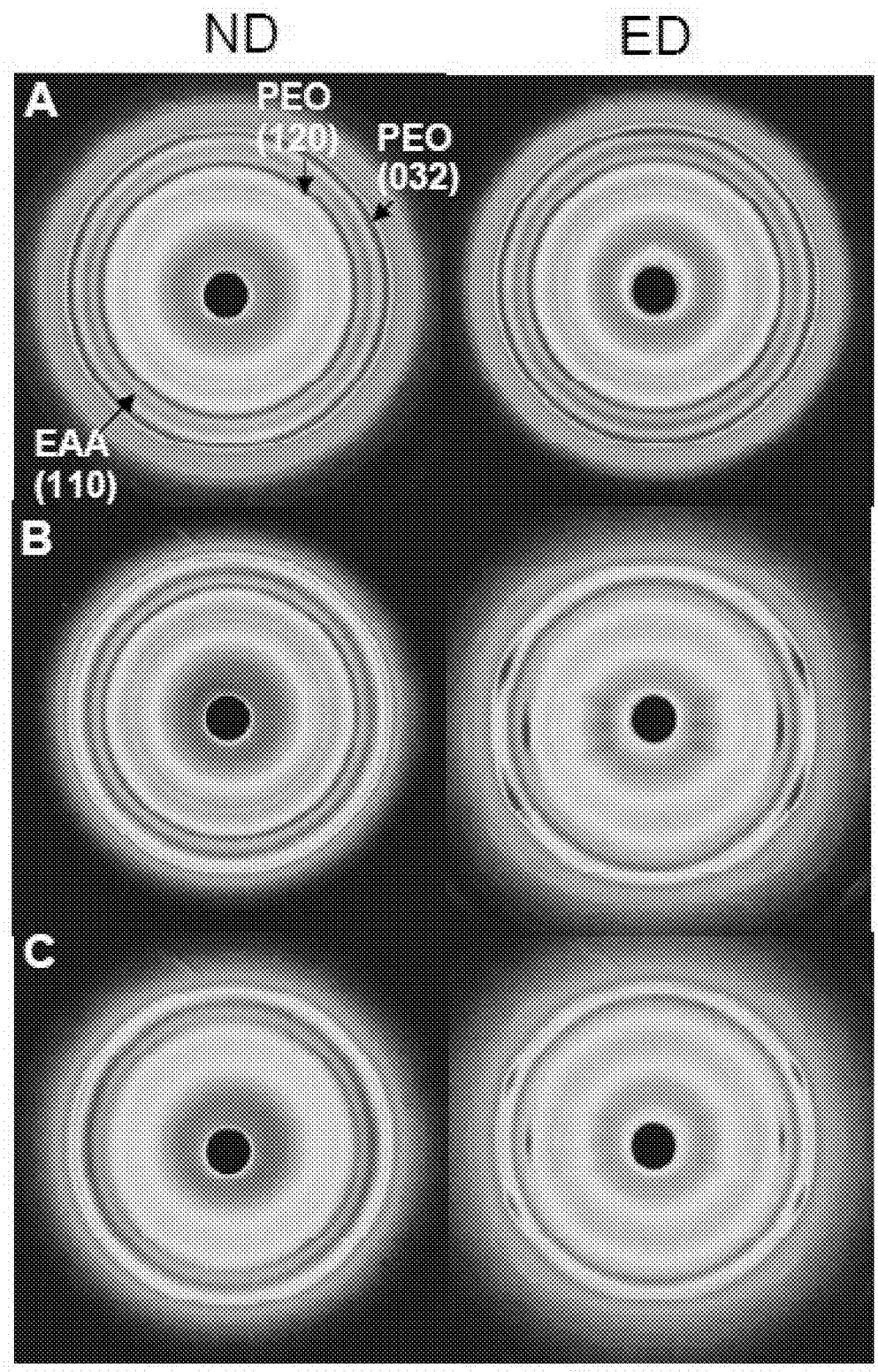
Figs. 13A-C

CONFINED CRYSTALLIZATION MULTILAYER FILMS

RELATED APPLICATION

This application claims priority from U.S. Provisional Application No. 61/120,140, filed Dec. 5, 2008, the subject matter, which is incorporated herein by reference.

GOVERNMENT FUNDING

This application was made with government support under Grant No. DMR0423914 awarded by The National Science Foundation. The United States government has certain rights in the invention.

TECHNICAL FIELD

The present invention is directed to a multilayer film and, in particular, to a method and apparatus for forming a multilayer film that includes a confined crystallization layer.

BACKGROUND

The rapid development of nanoscience and nanotechnology is driving an interest in ultra-thin polymer layers with highly controlled and selective gas barrier properties. New packaging strategies that utilize the unique gas transport characteristics of nanolayers could significantly address growing environmental and energy concerns. Considering the magnitude of the need, packaging with enhanced gas barrier and selectively could dramatically reduce the amount of food waste, thereby reducing world hunger, greenhouse gas generation and the load on global water and energy supplies (A. L. Brody, Food Technology 62(6), 121 (2008)).

Crystallization is a common approach for reducing gas permeability of polymers in the bulk (D. H. Weinkauf, D. R. Paul, in Barrier Polymers and Structures, W. J. Koros. Ed. American Chemical Society, Washington, D.C. 1990), pp. 60-91.). Crystallization is a self-organization process through which molecules are arranged in a regular order (M. D. Ward, Science 308, 1566-1567 (2005)). It is fundamental to the structural characteristics and the physicochemical properties of many substances, including inorganic materials, small organic molecules, synthetic polymers and biomacromolecules (V. Cherezov, D. M. Rosenbaum, M. A. Hanson, S. G. F. Rasmussen, F. S. Thian. T. S. Kobilka, H. J. Choi, P. Kuhn, W. J. Weis. B. K. Kobilka. R. C. Stevens, Science 318, 1258-1265 (2007); S. G. F. Rasmussen, H. J. Choi, D. M. Rosenbaum. T. S. Kobilka. F. S. Thian, P. C. Edwards, M. Burghammer, V. R. P. Ratnala, R. Sanishvili, R. F. Fischetti, G. F. X. Schertler, W. J. Weis, B. K. Kobilka. Nature 450, 383-U384 (2007)).

The two-dimensional crystallization of polymers is conventionally studied with polymeric thin films or block copolymers that contain at least one crystallizable block. In the former, crystallizable layers with nanometer to submicron thicknesses are prepared by a solution process such as Langmuir-Blodgett, spin-coating techniques. These approaches are limited by the solvent requirement and by the small amount of material that can be fabricated. In the latter, a lamellar phase morphology on the length scale of a few tens of nanometers can be achieved as a consequence of microphase separation of the dissimilar blocks below the order-disorder transition temperature (TODT) (F. S. Bates, G. H. Fredrickson, Annual Review of Physical Chemistry 41,525-557 (1990)). Shear-alignment is often necessary to construct well-defined layering with a uniformly oriented, micron-scale phase morphology (Z.-R. Chen, J. A. Kornfield, S. D. Smith, J. T. Grothaus, M. M. Satkowski Science 277,1248-1253 (1997)).

SUMMARY OF THE INVENTION

The present invention relates to a multilayer film that includes a first polymer layer coextruded with and confined between second polymer layers. The first polymer layer includes a high aspect ratio crystalline lamellae. The multilayer film can be substantially impermeable to gas diffusion.

In an aspect of the invention, the first polymer layer can form a substantially crystalline lamellae. The lamellae can extend in a plane parallel to the first layer and the second layers. The first polymer layer can include a first polymer that can readily form a substantially crystalline lamellae upon confinement between the second polymer layers. Examples of polymers that can be used as the first polymer are polyethylenes, polypropylenes, polyethylene oxide, polycaprolactone, polyamides, polyesters, and polyvinylidene fluoride.

The second polymer layer can include a thermoplastic or thermoformable second polymer that is immiscible or partially miscible with the first polymer and can readily confine the first polymer layer upon coextrusion. Examples of polymers that can be used as the second polymer are polystyrene, polycarbonate, polymethylmethacrylate, low-density polyethylene, polyamides, ethylene-co-acrylic acid, and polyoxymethylene.

The first polymer layer can have a thickness that is effective to promote crystallization of the first polymer layer. For example, the first polymer layer can have an average thickness of about 10 nm to about 500 nm. The aspect ratio of the substantially crystalline lamellae can be at least about 5, for example, at least about 10 to about 1000.

In another aspect of the invention, the multilayer film can include a plurality of alternating coextruded first polymer layers and coextruded second polymer layers. Each first polymer layer can be confined between second polymer layers. The alternating first layers and second layers can be arranged in a stack configuration and formed using a layer-multiplying forced coextrusion process.

The present invention also relates to a method of forming a confined crystallization multilayer film. The method includes coextruding a plurality of first polymer layers and a plurality of second polymer layer so that each first polymer layer is sandwiched between second polymer layers. Each first polymer layer comprises a high aspect ratio substantially crystalline lamellae. The multilayer film can be substantially impermeable to gas diffusion.

In an aspect of the invention, the multilayer film can comprise a stacked series of substantially crystalline lamellae. The lamellae can extend in a plane parallel to the first layers and the second layers. The first polymer layers can include a first polymer that can readily form a substantially crystalline lamellae upon confinement between the second polymer layers. Examples of polymers that can be used as the first polymer are polyethylenes, polypropylenes, polyethylene oxide, polycaprolactone, polyamides, polyesters, and polyvinylidene fluoride.

The second polymer layers can include a thermoplastic or thermoformable second polymer that is immiscible or partially miscible with the first polymer and can readily confine the first polymer layers upon coextrusion. Examples of polymers that can be used as the second polymer are polystyrene, polycarbonate, polymethylmethacrylate, low-density polyethylene, polyamides, ethylene-co-acrylic acid, and polyoxymethylene.

The first polymer layers can each have a thickness that is effective to promote crystallization of the first polymer layers. For example, each first polymer layer can have an average thickness of about 10 nm to about 500 nm. The aspect ratio of the substantially crystalline lamellae can be at least about 5, for example, at least about 10 to about 1000.

BRIEF DESCRIPTION OF THE DRAWINGS

FIG. 3 illustrates illustrates the 2D WAXS patterns and 2D SAXS patterns of polycaprolactone (PCL)/polystyrene (PS) multilayer films with different polycaprolactone layer thicknesses.

FIG. 10 illustrates AFM phase images of partial cross sections of the coextruded EAA/PEO films. (A) A low resolution image of an EEA/PEO film with 50/50 composition, 33 alternating layers and nominal PEO layer thickness of 3.6 μm shows the continuity of the coextruded layers. (B) A higher resolution image reveals the spherulitic morphology of the 3.6 μm-thick PEO layer. (C) A low resolution image of an EAA/PEO film with 70/30 composition, 1025 alternating layers and nominal PEO layer thickness of 110 nm shows the continuity of the coextruded layers. (D) A higher resolution image of the 100 nm-thick PEO layers shows the effect of confinement with crystallization of the PEO layers as stacks of 3-5 long thin lamellae oriented in the plane of the layer. (E) A high resolution image of an EAA/PEO film with 90/10 composition, 1025 alternating layers and nominal layer thickness of 20 nm shows that most of the PEO layers crystallized as single, extremely long lamellae. The EAA layers and PEO layers are identified by arrows.

FIG. 11 illustrates pole figures of normals to the (120) and (032) planes of the PEO monoclinic crystals. The X-ray beam is along the film extrusion direction and the pole is along the film normal direction. (A) There is no preferred orientation of the PEO crystals in the control film except for some very faint orientation due to the extrusion. (B) Orientation of PEO crystals in 3.6 μm PEO layers is also very weak. (C) Orientation of the (120) planes perpendicular to the layer plane and orientation of the (032) planes at 67° confirm that the lamellar PEO crystals are oriented with the fold surfaces parallel to the layer plane in a film with 50/50 composition, 1025 alternating layers and nominal PEO layer thickness of 110 nm. (D) Orientation of the lamellae in 20 nm PEO layers is even stronger as judged from the narrower rings in the (120) and (032) pole figures of films with 90/10 EAA/PEO composition and 1025 alternating layers.

FIG. 12 illustrates 2D SAXS patterns of EAA/PEO films with different PEO layer thicknesses. The patterns are measured along the normal direction (ND) and the extrusion direction (ED): (A) 3.6 μm PEO layers; (B) 110 nm PEO layers; and (C) 20 nm PEO layers. The PEO first-order, PEO second-order and EAA first-order peaks are marked with arrows. The scale bar in (A) defines the scattering vector q scale. The intense meridianal streak in the ED patterns is due to grazing incidence scattering.

FIG. 13 illustrates the 2D WAXS patterns of EAA/PEO films with different PEO layer thicknesses. (A) The ND and ED patterns from the 3.6 μm PEO layers confirm the usual monoclinic crystal form of PEO and show the isotropic orientation of the unit cell. (B) The ND and ED patterns from the 110 nm PEO layers show a high degree of orientation with the c-axis vertical to the layer plane. (C) Arcs in the WAXS pattern of 110 nm PEO layers are sharpened to spots in the WAXS pattern of 20 nm PEO layers.

DETAILED DESCRIPTION

The present invention relates to a multilayer film that includes at least one confined crystallization layer. The confined crystallization layer(s) can be formed by forced coextrusion of a first crystallizable polymer material and a second polymer material. The coextruded first crystallizable polymer material can form a plurality of first crystallization polymer layers that are confined or sandwiched between second polymer layers. Unexpectedly, it was found that the morphology of the first polymer layers changes as they are made progressively thinner using a layer-multiplying process. At thicknesses on a nano-scale level (e.g., about 5 nm to about 500 nm), each first polymer layer, as a result of the reduced thickness and forced confinement, can crystallize as a high aspect ratio lamellae that resembles single large, impermeable crystals.

The resulting multilayer film with confined crystallization layer can be substantially impermeable to gas diffusion and provide barrier properties that allow the multilayer film to be used in applications where selective diffusion of gases is desired. Such applications can include, for example, food packaging applications where it is desirable to prevent oxygen from diffusing into the package and carbon dioxide from diffusing out of the package, bladders for tubes or bellows, medical applications, as well as electronic display applications where it is desirable to prevent diffusion of gas.

Figure 1:
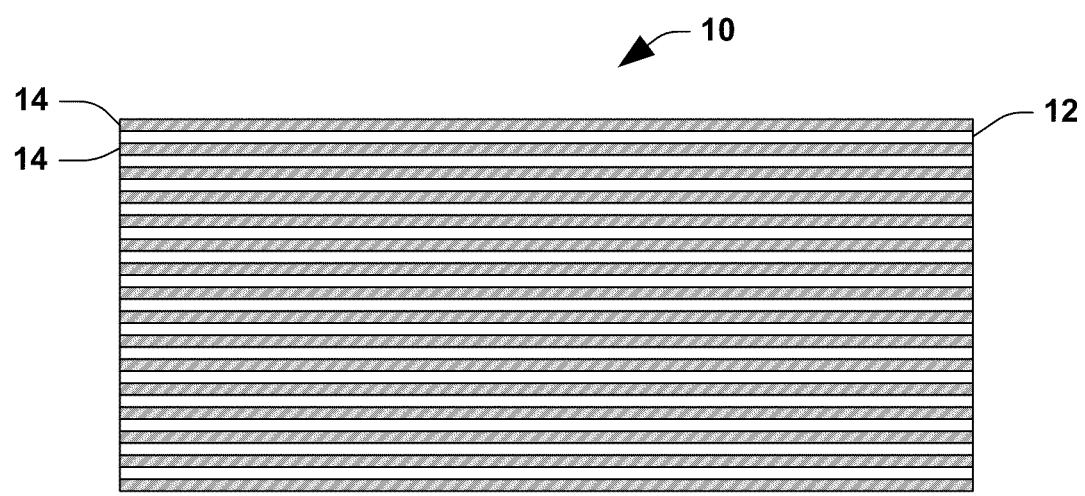
FIG. 1 illustrates a schematic view of a multilayer film in accordance with an aspect of the invention.

FIG. 1 is a schematic illustration of a multilayer film 10 in accordance with an aspect of the invention. The multilayer film 10 in this aspect comprises alternating first crystallization polymer layers 12 and second polymer layers 14. The second polymer layers 14 confine or sandwich each first crystallization polymer layers 12. Each first polymer layer can include a high aspect ratio lamellae that is continuous and extends substantially parallel to the first layers and the second layers. By "high aspect ratio", it is meant an aspect ratio of at least about 5, for example, at least about 100. In some aspects of the invention, the aspect ratio of the substantially crystalline lamellae can be about 10 to about 1000. In other aspects of the invention, the aspect ratio of the substantially crystalline lamellae can be about 100 to about 150.

The first polymer material used to form the confined first crystallization layers can include any thermoplastic or thermoformable polymer material that can be readily coextruded and form crystals upon confinement between the second polymer layers. Examples of polymers that can be used as the first polymer are polyethylenes, polypropylenes, polyethylene oxide, polycaprolactone, polyamides, polyesters, and polyvinylidene fluoride.

Figure 2:
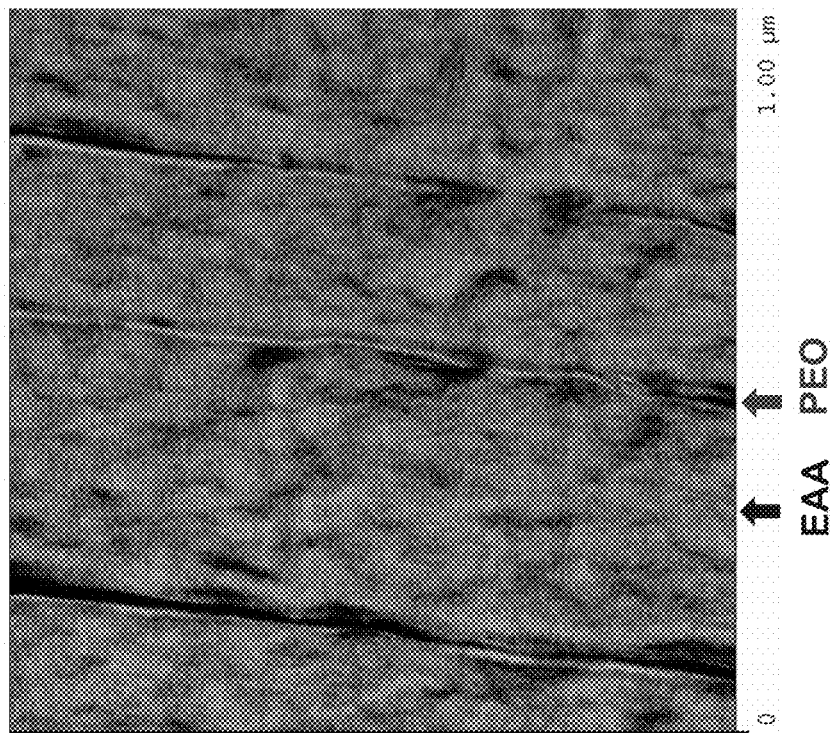
FIG. 2 illustrates an image of a polyethylene oxide (PEO) single crystal formed by continuous melt processing of a polyethylene oxide (PEO)/ethylene-co-acrylic acid (EAA) multilayer film.
Figure 2:
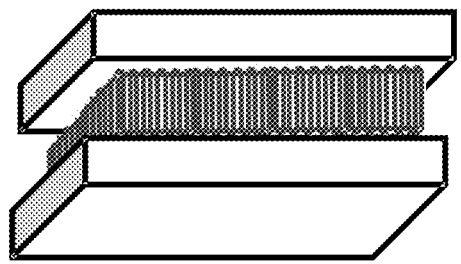

By way of example, the polymeric material used to form the confined first crystallization polymer layers can be polyethylene oxide. As illustrated in FIG. 2, it was found that layers of polyethylene oxide having an average thickness of about 10 nm to about 20 nm that are confined between ethylene-co-acrylic acid (EAA) can form single, high aspect ratio (e.g., an aspect ratio of at least about 120) lamellae that resemble single large, impermeable crystals.

The second polymer material that is used to form the second polymer layers, which confine the first polymer layers, can include any thermoplastic or thermoformable polymer material that can be readily coextruded with the first polymer material. In an aspect of the invention, the second polymer can include those thermoplastic or thermoformable polymers that are immiscible or partially miscible with the first polymer upon coextrusion. In another aspect of the invention, the second polymer can comprise a polymer that solidifies at a higher temperature than the first polymer to provide confinement of the first polymer layers. Examples of polymer material that can be used as the second polymer material include polyethylene naphthalate and isomers thereof, such as 2,6-, 1,4-, 1,5-, 2,7-, and 2,3-polyethylene naphthalate; polyalkylene terephthalates, such as polyethylene terephthalate, polybutylene terephthalate, and poly-1,4-cyclohexanedimethylene terephthalate; polyimides such as polyacrylic imides; polyetherimides; styrenic polymers, such as atactic, isotactic and syndiotactic polystyrene, α-methyl-polystyrene, para-methyl-polystyrene; polycarbonates, such as bisphenol-A-polycarbonate (PC); poycaprolactone; poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); ethylene/acrylic acid copolymers; cellulose derivatives such as ethyl cellulose, cellulose acetate, cellulose propionate, cellulose acetate butyrate, and cellulose nitrate; polyalkylene polymers, such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; polyetheramides. Copolymers can also be used and include, for example, styrene-acrylonitrile copolymer (SAN), containing between 10 and 50 wt %, preferably between 20 and 40 wt %, acrylonitrile, styrene-ethylene copolymer; and poly(ethylene-1,4-cyclohexylenedimethylene terephthalate) (PETG). In addition, the second layers can include blends of two or more of the above-described polymers or copolymers. In an aspect of the invention, the second polymer can be selected from the group consisting of polystyrene, polycarbonate, polymethylmethacrylate, low-density polyethylene, polyamides, ethylene-co-acrylic acid, and polyoxymethylene The multilayer film can be fabricated using these materials in a multilayer forced coextrusion method. The method can yield a flexible large film or sheet of multilayer structure. The thickness of the individual first confined crystallization layers can be such that each first layer forms a substantially crystalline lamellae. By substantially crystalline lamellae, it is meant that each first polymer layer is at least about 60% crystalline, at least about 70% crystalline, at least about 80% crystalline, at least about 90% crystalline, at least about 95% crystalline, or at least about 99% crystalline. This thickness can be on a nano-scale level and be, for example, from about 5 nanometers to about 1000 nanometers, from about 10 nanometers to about 500 nanometers, or from about 10 nanometers to about 20 nanometers. The thickness of each first layer will depend on the individual polymer material used form the first layers and can be readily selected to optimize crystallization properties (i.e., formation of high aspect ratio lamellae). In an aspect of the invention, the thicknesses of the first polymer layers should be such that a high aspect ratio crystalline lamellae is formed for each first polymer layer but not so thin that the first polymer layers readily break-up or fracture upon coextrusion or after confinement.

Figure 3:
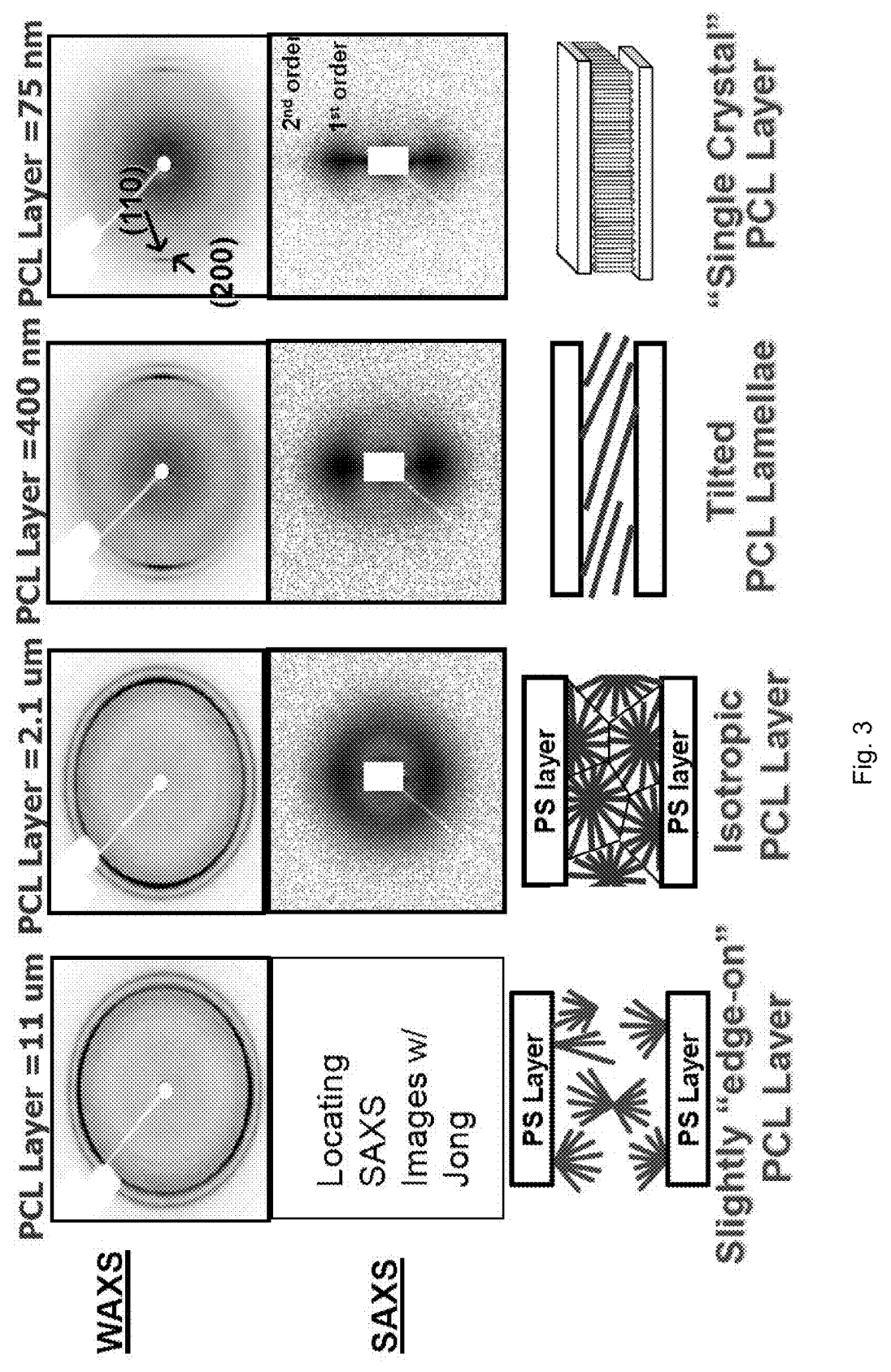
Figure 4:
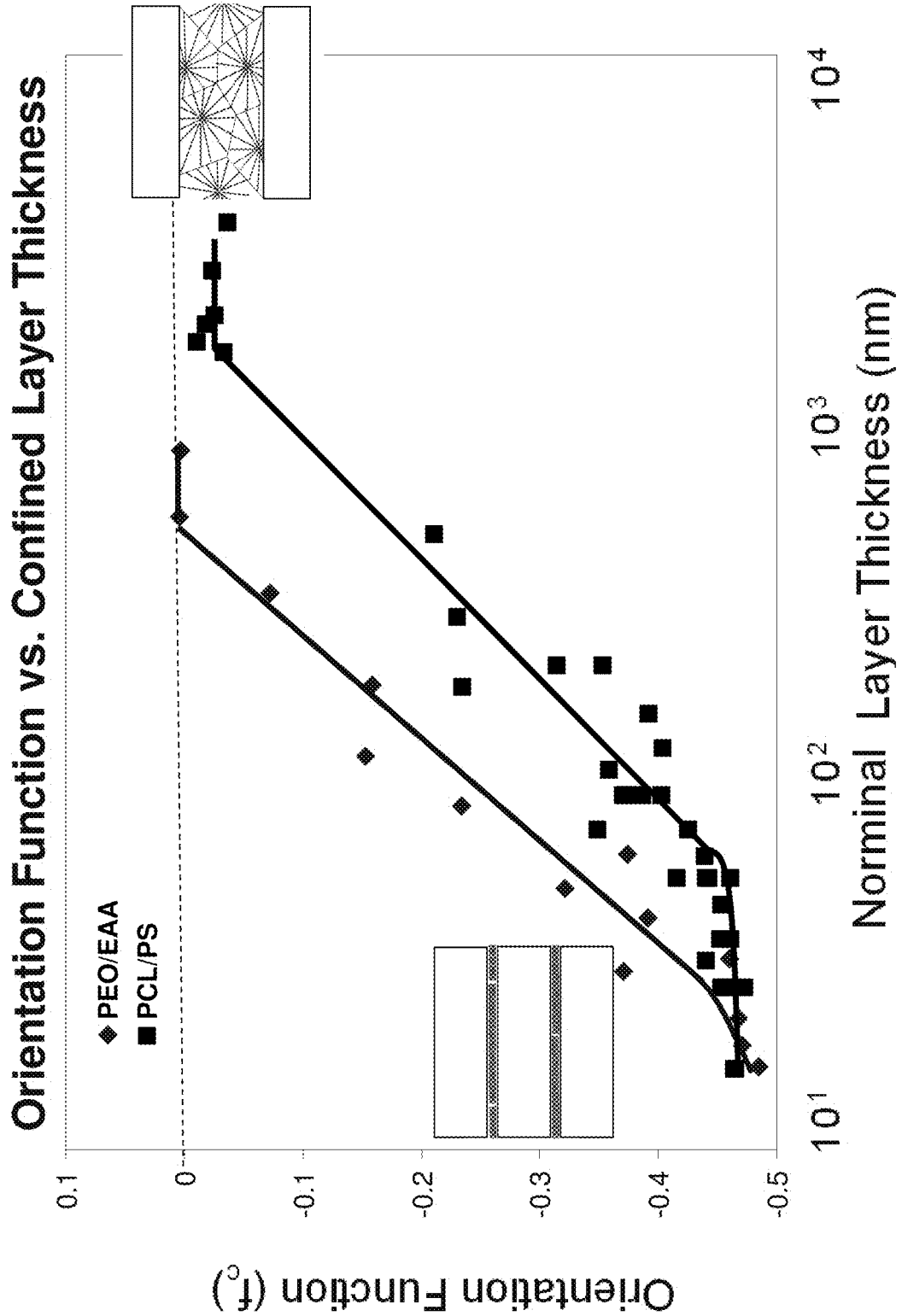
FIG. 4 illustrates plots showing the effect of confined layer thickness on crystal orientation function for polyethylene oxide (PEO)/ethylene-co-acrylic acid (EAA) multilayer films and polycaprolactone (PCL)/polystyrene (PS) multilayer films.

By way of example, FIG. 3 shows the crystal orientation as a function of thickness of a confined polycaprolactone layer of a multilayer film comprising polycaprolactone layers coextruded with and confined between polystyrene layers. The images show that as the thickness of the polycaprolactone layers decrease to about 75 nm the polycaprolactone layers transition from spherulitic to flat-on "single crystal" lamellae. FIG. 4 illustrates plots showing the crystal orientation as a function of confined layer thickness of a polycaprolactone/polystyrene coextruded multilayer film and a polyethylene oxide/ethylene-co-acrylic acid coextruded multilayer film. The plots show that the orientation function of the confined polycaprolactone layers and polyethylene oxide layers reduced almost linearly with decreasing layer thickness from isotropic to flat on lamellae.

Figure 5:
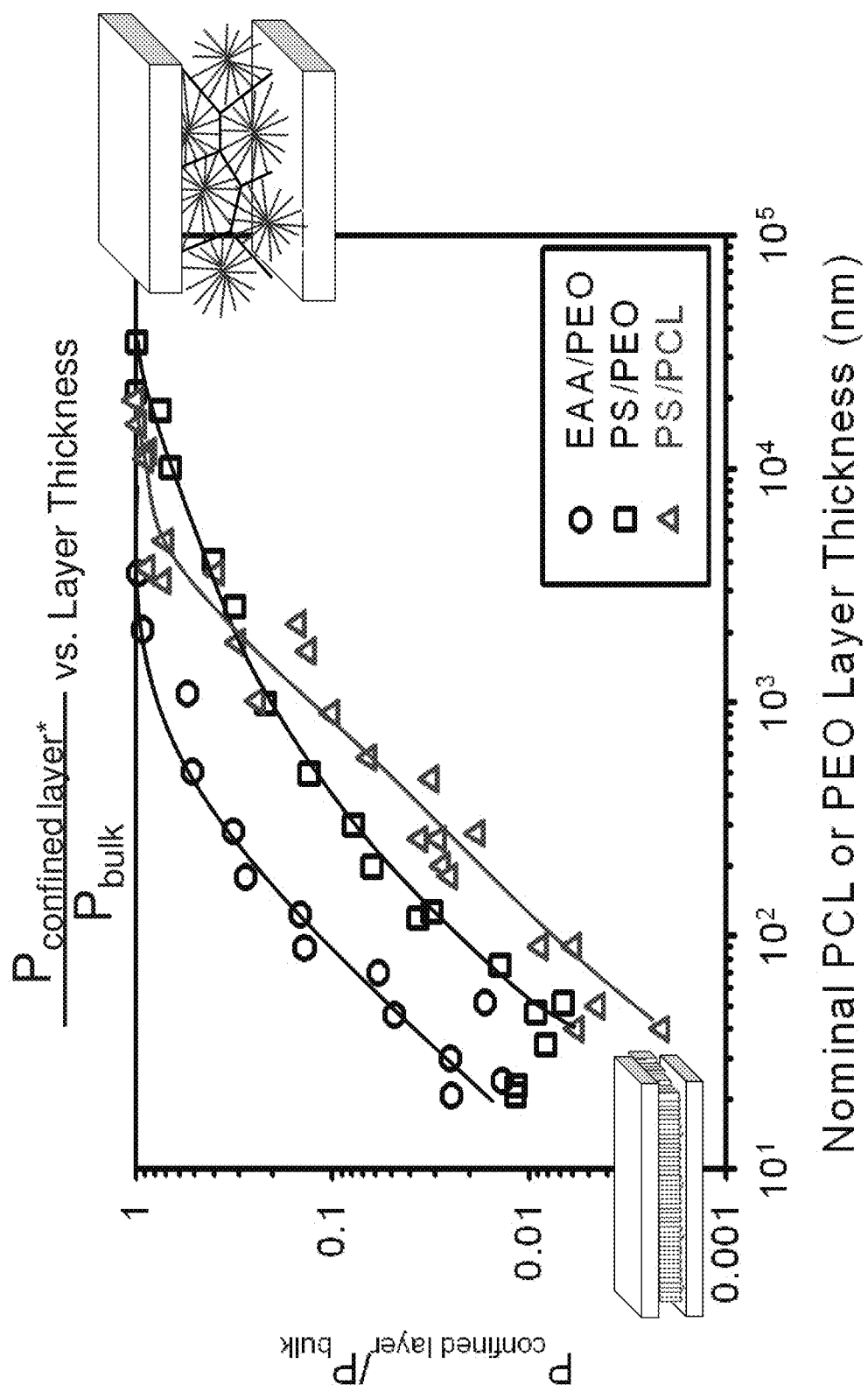
FIG. 5 illustrates plots showing the effect of confined layer thickness on gas permeability for polyethylene oxide (PEO)/ethylene-co-acrylic (EAA) acid multilayer films, polyethylene oxide (PEO)/polystyrene (PS) multilayer films, and polycaprolactone (PCL)/polystyrene (PS) multilayer films.

Crystals are generally considered to be impermeable to small gas molecules, and gas transport is seen as occurring through the amorphous regions of the polymer. FIG. 5 shows that as the confined layer thickness of, respectively, a polyethyleneoxide/ethylene-co-acrylic acid coextruded multilayer film, a polyethyleneoxide/polystyrene coextruded multilayer film, and a polycaprolactone/polystyrene coextruded multilayer film is reduced, crystallinity of the confined layers increase, and permeability of the confined layer decreases. Reduction in thickness and crystallization in a confined space resulted in an unusual crystalline morphology that endowed the confined layers with exquisitely low gas permeability.

The thickness of the individual second layers used to confine the first layers can be on a nano-scale level. The thicknesses of these layers can be, for example, from about 5 nanometers to about 1000 nanometers, from about 10 nanometers to about 100 nanometers, or from about 10 nanometers to about 20 nanometers.

In one aspect of the invention, the multilayer film can made of two alternating layers (ABABA . . . ) of the first polymer material referred to as component "(a)" and a second polymer material referred to as component "(b)". The components (a) and (b), may be the same or different and form a multilayer structure represented by formula (AB)x, where x=(2)n, and n is the number of multiplier elements. At least one of components (a) and (b) comprises a crystallizable polymer. It should be understood that the multilayer structure of the invention may include additional types of layers. For example, these other layers can include tie layers, adhesive layers, and/or other polymer layers. The components of the various alternating layers may be the same or different as long as at least one component includes a crystallizable polymer. For instance, a three component structure of alternating layers (ABCABCA . . . ) of components (a), (b) and (c) is represented by (ABC)x, where x is as defined above.

Figure 6:
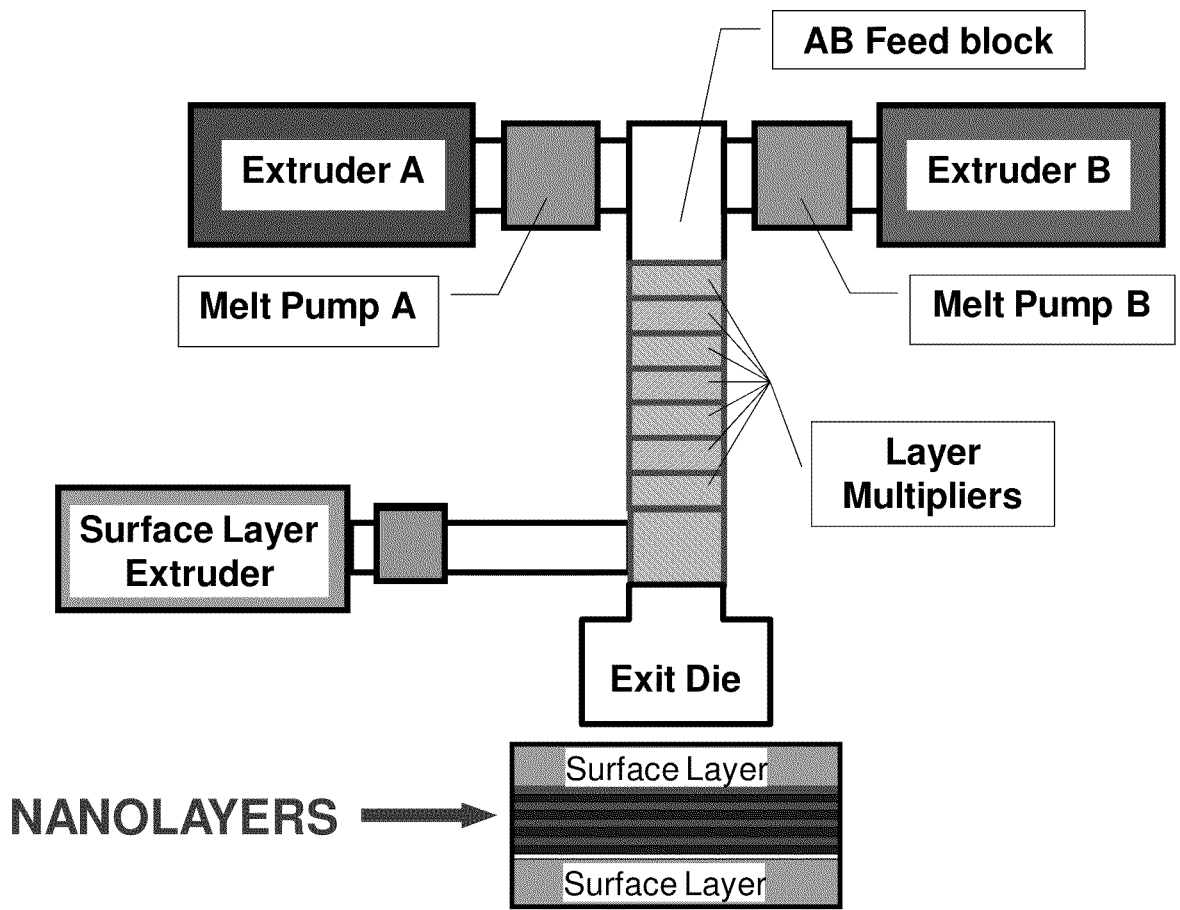
FIG. 6 is a schematic illustration of a layer-multiplying coextrusion process for forced-assembly of polymer nanolayers in accordance with an aspect of the invention.
Figure 7:
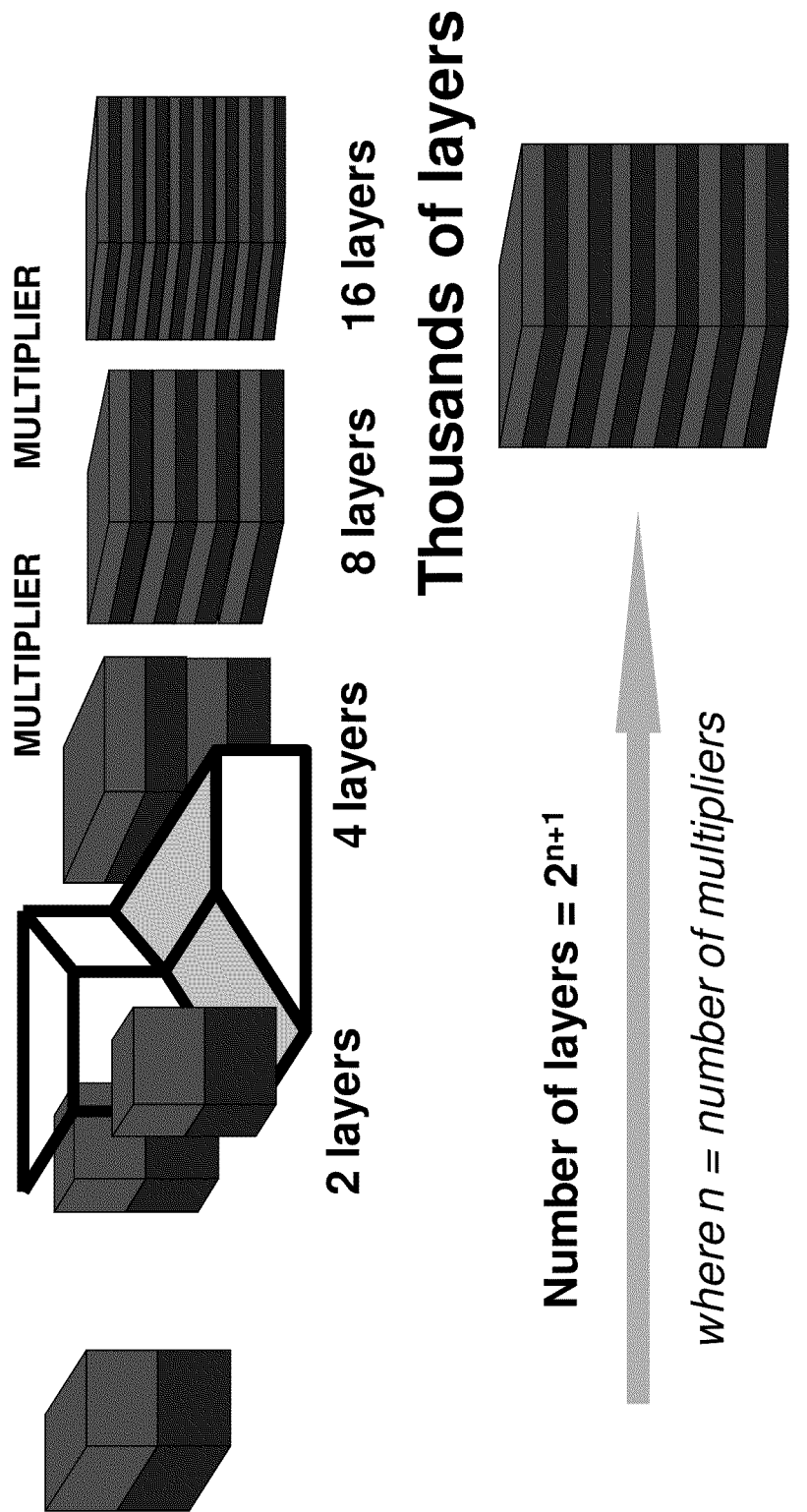
FIG. 7 is a schematic illustration of a layer-multiplying coextrusion for forced-assembly of polymer nanolayers in accordance with another aspect of the invention.

The multilayer polymer film layer can be prepared by microlayer coextrusion of the two polymer materials. Nanolayers are comprised of alternating layers of two or more components with individual layer thickness ranging from the microscale to the nanoscale. A typical multilayer coextrusion apparatus is illustrated in FIGS. 6 and 7. The two component (AB) coextrusion system consists of two ¾ inch single screw extruders each connected by a melt pump to a coextrusion feedblock. The feedblock for this two component system combines polymeric material (a) and polymeric material (b) in an (AB) layer configuration. The melt pumps control the two melt streams that are combined in the feedblock as two parallel layers. By adjusting the melt pump speed, the relative layer thickness, that is, the ratio of A to B can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence (AB)x where x is equal to (2)n and n is the number of multiplying elements. It is understood by those skilled in the art that the number of extruders used to fabricate the structure of the invention equals the number of components. Thus, a three-component multilayer (ABC . . . ), requires three extruders.

The multilayer film of the present invention preferably have at least 3 layers, for example, at least about 30 layers, 50 layers, 100 layers, or 1000 layers, including any number of layers within that range. In one example, the multilayer film of the present invention has from 50 to 10000 layers. In another example, the multilayer structure is in the form of film or sheet. By altering the relative flow rates or the number of layers, while keeping the film or sheet thickness constant, the individual layer thickness can be controlled. The multilayer film or sheet has an overall thickness ranging from 10 nanometers to 1000 mils, preferably from 0.1 mils to 125 mils and any increments therein. Further, the multilayer films may be formed into a number of articles by, for example, thermoforming, vacuum forming, or pressure forming. Further, through the use of forming dies, the multilayer films may be formed into a variety of useful shapes including profiles, tubes and the like.

The following examples are for the purpose of illustration only and are not intended to limit the scope of the claims, which are appended hereto.

Example

In the present example, crystalline polyethylene oxide (PEO) with Mw=200 kg/mol was coextruded with poly (ethylene-co-acrylic acid) (EAA), a copolymer with 9.7 wt % acrylic acid and with much lower crystallinity. Films of 50 μm, 130 μm or 260 μm in thickness with 33, 257 or 1025 alternating EAA and PEO layers were coextruded (C. D. Mueller, S. Nazarenko, T. Ebeling, T. L. Schuman, A. Hiltner, E. Baer, Polym, Eng, Sci, 37, 355-362 (1997); T. E. Bernal-Lara, A. Ranade, A. Hiltner, E. Baer, in Mechanical Properties of Polymers Based on Nanostructure, 1st edition, G. H. Micheler, F. Balta-Callaja, Eds. (CRC press, Boca Raton, Fla. 2005), pp. 629-682). Control films of PEO and EAA were also extruded. The composition (vol/vol) was varied as EAA/PEO 50/50, 70/30, 80/20 and 90/10. The resulting nominal PEO layer thickness, which was calculated from the number of layers, the composition ratio, and the film thickness, varied from 3.6 μm to 8 nm. The films were stored in a desiccator to prevent moisture absorption. The size-scale effect on crystalline morphology and gas permeability were observed as the PEO layers were made thinner and the confinement by the EAA layers approached the nanoscale.

Layer-Multiplying Coextrusion

Films with alternating poly(ethylene oxide) (PEO) and poly(ethylene-co-acrylic acid) (EAA) layers with EAA outer layers were fabricated using the layer multiplication process described previously. The schematic drawing of layer-multiplying coextrusion in FIGS. 6 and 7 show how a series of n multiplying elements combines two dissimilar polymers as 2(n+1) alternating layers. With an ABA type of feedblock, an assembly of n die elements produces 2(n+1)+1 layers with polymer A layers on both outer sides of the film. The extruder, multipliers and die temperatures were set to 190° C. to ensure matching viscosities of the two polymer melts. Multilayered films with 33, 257 and 1025 alternating EAA and PEO layers were coextruded as films of various thicknesses and various composition ratios (vol/vol) including (EAA/PEO) 50/50, 70/30, 80/20 and 90/10. The nominal layer thickness was calculated from the number of layers, the composition ratio and the film thickness (Table 1). The films were stored at ambient temperature in desiccators to prevent moisture absorption.

TABLE 1

Film composition, number of layers, film thickness and nominal PEO layer thickness of EAA/PEO films

| EAA/PEO (v/v) | Number of Layers | Film Thickness (μm) | Nominal PEO layer Thickness (nm) |
|---|---|---|---|
| 0/100 | 1025 | 110 | — |
| 50/50 | 33 | 115 | 3600 |
| 70/30 | 33 | 110 | 2060 |
| 50/50 | 257 | 282 | 1100 |
| 50/50 | 257 | 130 | 510 |
| 70/30 | 257 | 120 | 280 |
| 50/50 | 257 | 46 | 180 |
| 50/50 | 1025 | 127 | 125 |
| 70/30 | 1025 | 260 | 110 |
| 70/30 | 257 | 38 | 90 |
| 70/30 | 1025 | 119 | 70 |
| 80/20 | 1025 | 133 | 50 |
| 50/50 | 1025 | 47 | 45 |
| 70/30 | 1025 | 51 | 30 |
| 80/20 | 1025 | 61 | 25 |
| 90/10 | 1025 | 107 | 20 |
| 90/10 | 1025 | 42 | 8 |
| 100/0 | 1025 | 121 | — |

Materials and Methods

Poly(ethylene oxide) (PEO) with molecular weight of 200 kg/mol (PolyOx WSR N-80) and ethylene acrylic acid copolymer (EAA) with 9.7 wt % acrylic acid (Primacorl410) were obtained from The Dow Chemical Company. Both EAA and PEO were dried under vacuum before processing.

Oxygen permeabilities at 23° C., 0% relative humidity and 1 atm pressure were measured with a MOCON OX-TRAN 2/20. The instrument was calibrated with National Institute of Standards and Technology certified Mylar film of known O2 transport characteristics. The specimens were carefully conditioned in the instrument, as described previously (D. J. Sekelik, E. V. Stepanov, S. Nazarenko, D. Schiraldi, A. Hiltner, E. Baer, Polym. Sci. Pt. B-Polym. Phys. 37, 847-857 (1999)). The O2 permeability P was calculated from the steady state flux.1 as $$P = J \frac{l}{\Delta p}$$

where l is the film thickness and $\Delta p$ is the difference of the oxygen partial pressure between upstream and downstream.

Differential scanning calorimentry (DSC) was conducted with a Perkin-Elmer DSC-7 at a heating rate 10° C. min−1. The crystallinity calculated from $\Delta Hm$ was 78 wt % for PEO and 34 wt % for EAA using the heat of fusion)($\Delta H°$) values of 197 J g-1 for PEO crystals (C. Campbell, K. Viras, M. J. Richardson, A. J. Masters. C. Booth, Makromol. Chem. 194, 799-816 (1993)) and 290 J g-1 for polyethylene crystals (B. Wunderlich, Macromolecular Physics (Academic Press: New York, 1980), vol. 3,42).

Embedded films were microtomed through the thickness at −75° C. with a cryo-ultramicrotome (MT6000-XL from RMC) and cross-sections were examined with an atomic force microscope (AFM) in order to visualize the layers and the morphology inside layers. Phase and height images or the cross-section were recorded simultaneously at ambient temperature in air using the tapping mode of the Nanoseope IIIa MultiMode scanning probe (Digital Instruments).

Small-angle X-ray scattering (SAXS) measurements were carried out using an inhouse set-up with rotating anode X-ray generator (Rigaku RU 300, 12 kW) equipped with two laterally graded multilayer optics in a side-by-side arrangement, giving a highly focused parallel beam of monochromatic Cu Kα radiation ($\lambda$=0.154 nm). The monochromatic X-ray beam operated at 50 kV and 100 rnA was collimated using three pinholes and the diameter of X-ray beam at sample position was approximately 700 μm. For the collection of ED and TO SAXS patterns, since the dimensions of the films (42~282 μm thick and 2 mm wide) were smaller than the collimated X-ray beam, X-ray beam was irradiated along ED and TD at an angle of ~3° to avoid total reflection. The critical angle for the total reflection is usually the order of a few tenths of a degree. On the other hand, in order to collect ND SAXS patterns, X-ray beam was irradiated along the direction parallel to ND of multilayered films. Two dimensional (2D) SAXS were collected by using a 2D gas filled multiwire detector (Rigaku) with a spatial resolution 1024×1024 pixels. The X-ray exposure times for ED, TD and ND SAXS patterns were all 9 hours. A sample-to-detector distance was 1.5 m and the scattering vector q was calibrated using Silver Behenate (AgBe) standard, which had (001) peak position at q=1.076 nm−1. A beamstop placed in front of the area detector allowed monitoring the intensity of the direct beam. Based on the intensity of direct beam, all SAXS images were corrected for background scattering, dark current and sample absorption.

Wide angle X-ray scattering (WAXS) measurements were performed using a Statton camera coupled to a Philips PW 1830 X-ray generator (Cu Kα radiation, $\lambda$=0.154 nm) operated at 30 kV and 35 mA. The collimated beam diameter was 250 μm. 2D WAXS images were collected using imaging plate and exposed imaging plates were read with a Fujifilm FDL5000 image plate reader. The sample-to-detector distance was 60 mm and the diffraction angle was calibrated using CaF2, standard. Several film pieces were stacked and glued with isocyanate 10 s glue. The thickness of the stack was approximately 0.5 mm. The stacks were exposed in three orthogonal directions. For directions in the plane of the film, the stack was sectioned perpendicular to the plane of the film to obtain the dimension of 1 mm in the X-ray beam direction.

The orientation of crystalline phase of PEO in the multilayered films was further studied by means of X-ray diffraction with pole figures. For overview of this technique, see Ref. (L. E. Alexander, X-Ray Difraction Methods in Polymer Science (Wiley: New York, 1969)). A WAXS system consisting of a computer-controlled pole figure device associated with a wide-angle goniometer coupled to a sealed tube X-ray generator operating at 50 kV and 30 mA (Philips) was used in this study. The X-ray beam consisted of Cu Kα radiation filtered electronically and by Ni filter. The specimens in the form of sandwiched films approx. 0.5 mm thick were assembled with extrusion direction vertical. The (120) and (032) crystal planes of commonly found monoclinic form of PEO were analyzed (diffraction maxima centered around $2\theta$=19.2° and 23.3°, respectively) and the respective pole figures were constructed. Experimental diffraction data were corrected for background scattering, sample absorption and defocusing of the beam. All pole figures were plotted with the POD program (Los Alamos National Lab, NM), Other details of the experimental procedure were described elsewhere (M. Pluta, Z. Bartczak, A. Galeski, Polymer 41,2271-2288 (2000)).

Results

Figure 8:
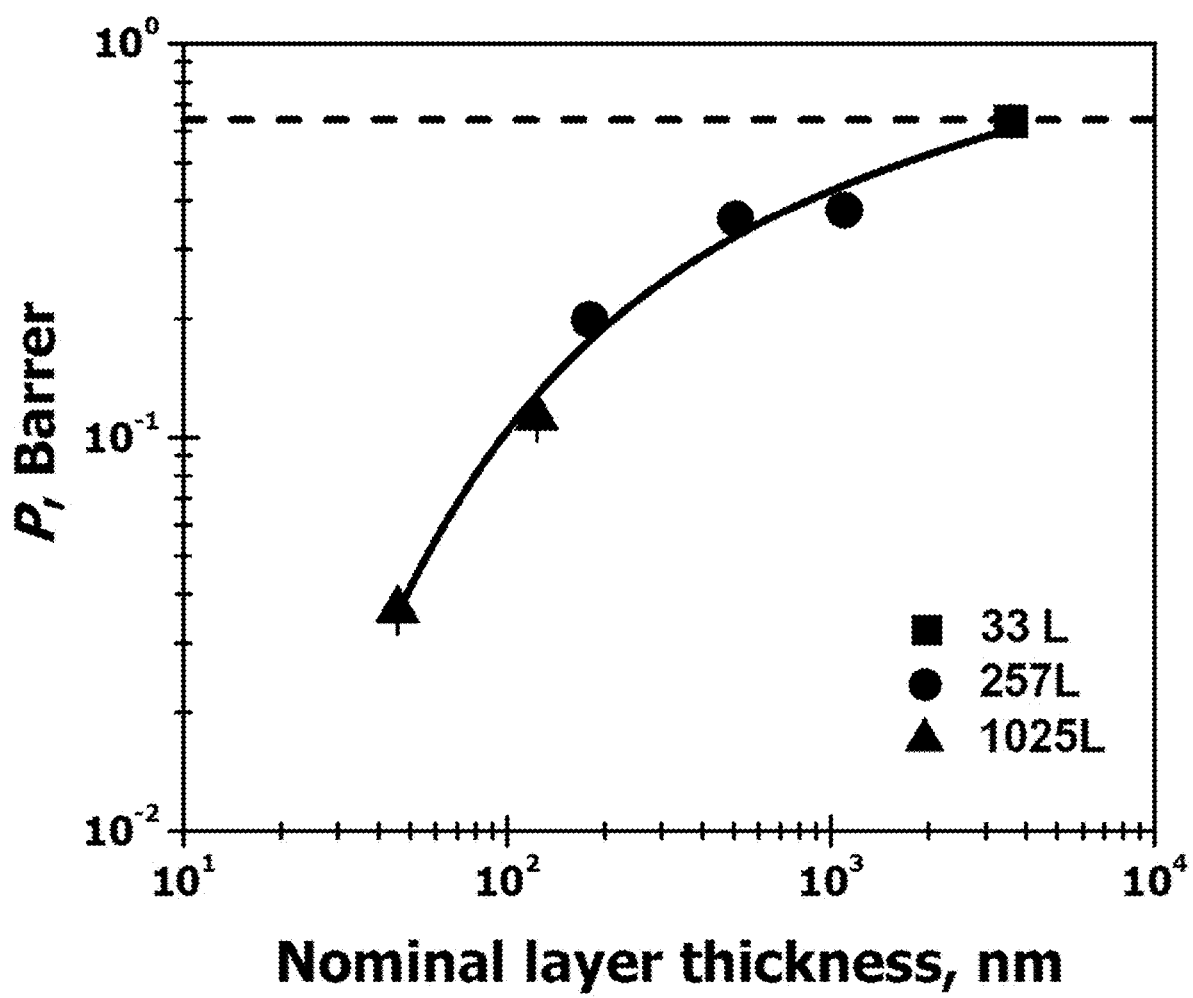
FIG. 8 illustrates plots showing the effect of layer thickness on oxygen permeability. The PEO and EAA layers had the same thickness, and the layer thickness was varied by changing the number of coextruded layers and/or the film thickness while maintaining the composition at 50/50 v/v. The dashed line indicates the calculated P// from eq(1).

Permeability to small molecules is an important performance property of polymer films. However, a deeper analysis of the gas transport characteristics provides a probe into the solid state structure (A. Hiltner, R. Y. F. Liu, Y. S. Hu, E. Bacr, J. Polym. Sci. Pt. B-Polym. Phys. 43, 1047.1063 (2005)), especially if used in combination with other solid state characterization techniques. Using commercial instruments from Macon (D. J. Sekelik, E. V. Stepanov, S. Nazarenko, D. Schiraldi, A. Hiltner, E. Baer, J. Polym. Sci. Pt. B-Polym. Phys. 37,847-857 (1999)), the oxygen permeability (P) was first measured on films with the EAA/PEO 50/50 composition. In this set of experiments, the PEO and EAA layers had the same thickness, and the layer thickness was varied by changing the number of coextruded layers and the film thickness while maintaining the composition at 50/50. The results are plotted in FIGS. 8 as a function of layer thickness. Surprisingly, the oxygen permeability decreased steadily as the EAA and PEO layers became thinner. The permeability of a film with 45 nm-thick layers was about 1.5 orders of magnitude lower than the permeability of a film with 3.6 μm-thick layers. A comparable reduction was found with carbon dioxide permeability.

The series model for layered assemblies gives the gas permeability as $$P_{//} = \left(\frac{\theta_{PEO}}{P_{PEO}} + 1 - \frac{\theta_{PEO}}{P_{EAA}}\right)^{-1}$$

where $\Phi_{PEO}$ is the volume fraction of PEO, and $P_{PEO}$ and $P_{EAA}$ are the permeabilities of PEO and EAA extruded control films, respectively. Using the determined values of 0.38 barrer and 2.30 barrer for $P_{PEO}$ and $P_{EAA}$, equation (1) gave the permeability of an EAA/PEO 50/50 layered assembly as 0.65 barrer. However, only the film with the thickest layers conformed to the prediction.

Figure 9:
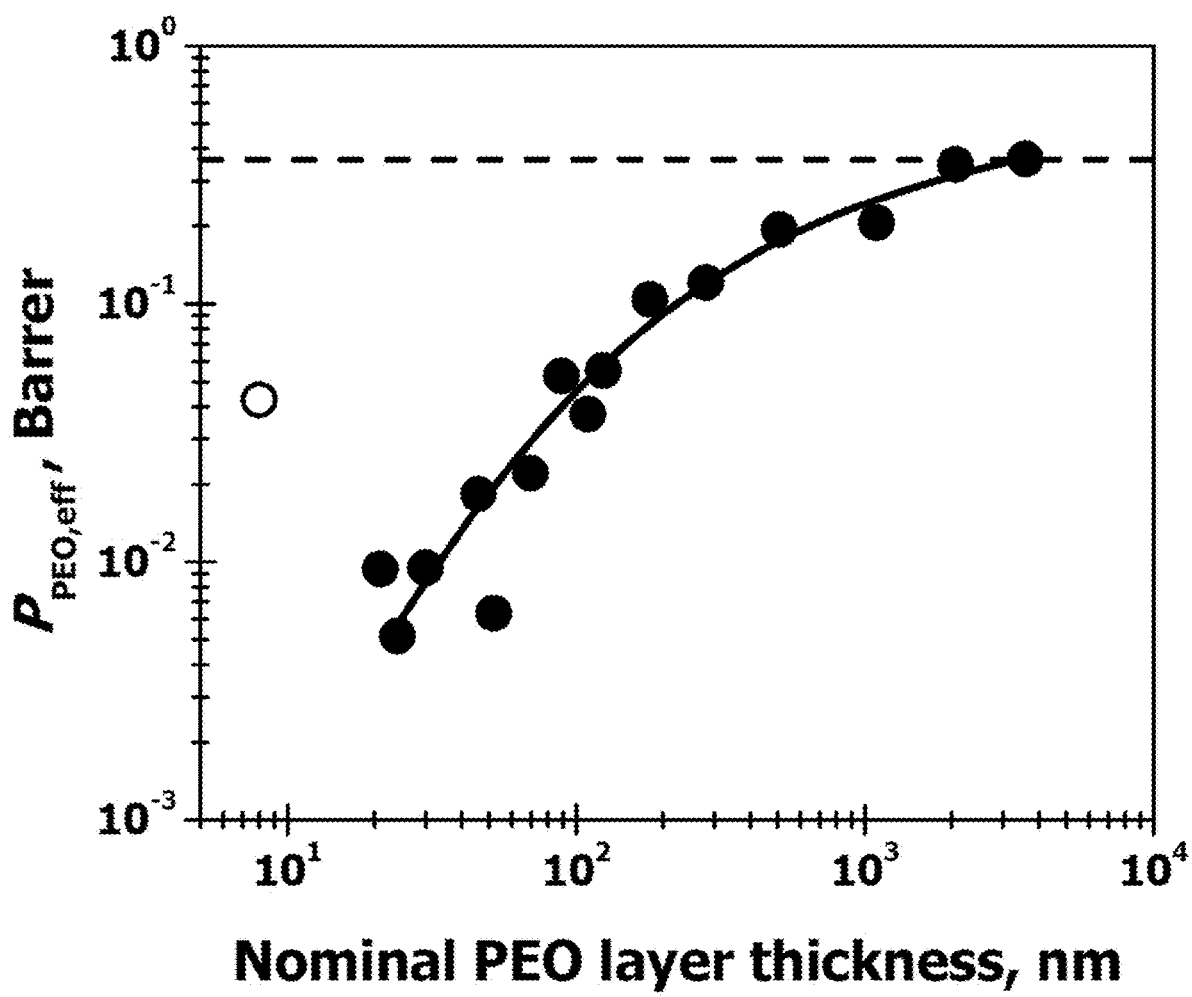
FIG. 9 illustrates plots showing the effect of layer thickness on oxygen permeability. Films that varied in both the composition ratio and the layer thickness were tested and the oxygen permeability of the PEO layer $P_{PEO,eff}$ was calculated from eq. (2). The dashed line indicates PPEO. The open symbol is for a film with PEO layer breakup. The solid lines are drawn to guide the eyes.

Noting that PEO is substantially less permeable to oxygen than EAA, equation (1) predicts that P// will be quite sensitive to $P_{PEO}$ even if $\Phi$PEO is relatively small. To ascertain whether a dramatic change in the PEO permeability was responsible for the layer thickness effect, the permeability of numerous films that varied in both the composition ratio and the layer thickness was tested. Although the measured values of P scattered, depending on the composition ratio, when an effective $P_{PEO}$,eff was extracted by assuming $$P_{PEO,eff} = \theta_{PEO}\left(\frac{1}{P} + \frac{1-\theta_{PEO}}{P_{EAA}}\right)^{-1}$$

the data collapsed to a single curve when $P_{PEO,eff}$ was plotted as a function of the PEO layer thickness, FIG. 9. Only the results for the thicker PEO microlayers conformed to equation (2) with $P_{PEO,eff\sim PEO}$, as indicated by the dashed line. Deviation below the line was seen with 1 μm-thick PEO layers. The lowest value of $P_{PEO,eff}$ was 0.0052 barrer, which was almost 2 orders of magnitude less than $P_{PEO}$.

Crystals are generally considered to be impermeable to small gas molecules, and gas transport is seen as occurring through the amorphous regions of the polymer. It seemed likely that crystallization in a confined space resulted in an unusual crystalline morphology that endowed the PEO nanolayers with exquisitely low permeability. However, differential scanning calorimetry revealed that even in the thinnest layers, both PEO and EAA possessed the same melting enthalpy and the same melting temperature as the non-layered film controls, which were 153 J/g and 66° C. for PEO, and 98 J/g and 98° C. for EAA, respectively. Thus, any unusual crystalline morphology that provided the very low permeability of PEO nanolayers was not accompanied by changes in the 70% level of crystallinity or in the lamellar thickness.

The layers were viewed directly by microtoming the film through the thickness and examining the exposed surface in the atomic force microscope (AFM). A region from the cross-section of a film with 3.6 μm-thick PEO layers and EAA/PEO 50/50 composition confirmed that the layers were well-defined and continuous, FIG. 10A. The PEO had substantially higher crystallinity than the EAA, and hence the PEO layers appeared bright in the AFM images. Although there was some nonuniformity, the average layer thickness was close to the nominal layer thickness calculated from the film thickness, the composition ratio and the total number of layers. A higher magnification image showed the sharp boundaries between EAA and PEO layers, and revealed the spherulitic morphology of the PEO layer, FIG. 10B. The spherulites appeared to nucleate predominantly within the PEO layer and only occasionally from the interface. There was no apparent orientation of the morphological features relative to the layered structure. Rather, the morphology closely resembled the isotropic spherulitic morphology of PEO crystallized from the unconfined melt. It was expected that the properties of the PEO layers would also be the same, and indeed, the oxygen permeability of films with thick PEO layers closely conformed to equation (2) with $PP_{EO,eff\sim PPEO}$.

Another pair of images in FIGS. 10C-D compares a film with 110 nm-thick PEO layers and, in this case, an EAA/PEO 70/30 composition. Because the layer thickness was orders of magnitude lower than in FIGS. 10A-B, the scale of the AFM images is different. Again, the images confirmed the continuity of the thin PEO layers and the close correspondence between the average layer thickness and the nominal thickness. At higher magnification, the effect of confinement on crystallization of the PEO layer was apparent. The PEO crystallized as stacks of three to five long thin lamellae oriented in the plane of the layer.

When the PEO layer thickness was reduced to 20 nm, most of the PEO layers crystallized as single, extremely long lamellae, FIG. 10E. In contrast to the lamellar stacks in 110 nm layers, the length of the single lamellae in 20 nm layers frequently exceeded the dimension of the AFM images. Due to the variation in layer thickness, an occasional PEO layer was thick enough to crystallize with two parallel lamellae. Coincidence between the layer thickness, which was determined by the extrusion conditions, and the thickness of PEO lamellae, about 20 nm, facilitated crystallization of the layers as single lamellae. The individual PEO layers could be thought of as very large single crystals.

If the layer thickness was reduced to 8 nm, the layers broke up. This was confirmed with AFM images. It was possible that breakup occurred during crystallization, driven by crystallization of lamellae with thickness greater than the layer thickness, rather than by interfacial driven breakup of the melt. Layer breakup was the cause of the increased permeability of the film with 8 nm PEO layers.

The unique crystalline morphology was responsible for the very low gas permeability of 20 nm PEO layers. For a continuous single crystal, the fold surfaces constitute the permeable amorphous regions. A diffusion pathway through the impermeable crystalline core depends on the frequency of defects such as lamellar edges. Structurally, the nanolayered assembly resembles a dispersion of impermeable platelets of given aspect ratio, which has been modeled by Cussler et al. (E. L. Cussler, S, E. Hughes, W. J., m Ward, R. Aris,. J. Membr. Sci, 38,161-174 (1988)). If the platelets are oriented perpendicular to the flux, the permeability of the composite is expressed as $$P = P_{EAA}\left[\frac{1+\alpha^2\theta^2}{4(1-\theta)}\right]$$

where $\Phi$ is the volume fraction of impermeable platelets and $\alpha$ is the aspect ratio of the platelets defined as length divided by width. In this case, $\Phi$ was taken as the volume fraction of the PEO layers multiplied by the volume fraction of the PEO crystalline phase. For PEO nanolayers, the aspect ratio from equation (3) was as high as 120, which meant a lateral dimension of more than 2 μm for lamellae 20 nm thick. This exceeded the dimension of the AfM image, which explained why the lamellae in FIG. 10E often appeared to be continuous.

Single Crystal Texture of Confined PEO Layers

Confirmation of the oriented lamellar morphology and details of the global orientation were obtained with small angle X-ray scattering (SAXS) and wide angle X-ray scattering (WAXS). The SAXS examines the periodic arrangement of lamellar crystals within the constituent layers. By aligning the incident X-ray beam parallel to the normal direction (ND), the extrusion direction (ED) and the transverse direction (TD), the particular orientation of lamella was determined from the corresponding patterns (see supporting material). The scattering patterns indicated that the long spacing of the PEO and EAA lamellae in layered films remained nearly the same as in the control films and they were 22±0.6 nm and 10.8±0.5 nm, respectively. Isotropic scattering patterns in all three directions from 3.6 µm PEO layers indicated that the PEO layer was too thick for PEO lamellae to feel any significant confinement effect. However, as the PEO layer thickness decreased to 110 nm, highly oriented meridianal two-point scattering features of the stacked PEO lamellae appeared in the ED and TD patterns, which indicated that PEO lamellae were oriented and stacked primarily parallel to the layer surface due to the confinement effect. Scattering from the 20 nm PEO layers further confirmed the single population of in-plane lamellae that had grown in the direction parallel to the PEO layers. The extremely weak first-order peak from the PEO layers indicated that they existed predominantly as single lamellae, rather than as stacked lamellae, as observed in FIG. 10E. It was thought that the observed weak lamellar correlation peak from 20 nm PEO layers was associated with the thickness distribution of the layers, which occasionally enabled formation of two single crystals in a single PEO layer.

The orientation of PEO chains in crystal was examined by using 2D WAXS and pole figure technique. Consistent results were obtained by these two techniques (see supporting material for 2D WAXS). In FIG. 11, the pole figures of normals to (120) and (032) planes of PEO are presented for the PEO control film and three EAA/PEO layered films. From FIG. 4 it is seen that there is no preferred orientation of PEO crystals except for very faint orientation due to extrusion direction (vertical). In FIG. 11B, the film with 3.6 µm-thick PEO layers showed a very weak orientation of PEO crystals, which in fact could be identified as an artifact due to slight defocusing of the X-ray beam when the specimen was tilted during data collection. In contrast, films with 110 nm-thick PEO layers showed a very strong orientation of (120) and also (032) planes as seen in FIG. 11C. Nearly all the (120) planes that contain macromolecular chains are perpendicular to the film plane. This means that the fold surfaces of the lamellar PEO crystals are parallel to the layer interfaces. Upon decreasing the PEO layer thickness to 20 nm, the preferred orientation of PEO lamellae parallel to the layers seems even stronger as can be judged from the narrower ring at the pole figure circumference, FIG. 11D. The (120) planes were distributed evenly in the plane of film, always being perpendicular to the film surface. The (032) planes of PEO crystals are tilted by 67° from the chain axis (22). The pole figures for (032) normals in FIGS. 11C-D resemble rings exactly off-set by 67° as predicted by the crystallographic unit cell for orientation of PEO lamellae parallel to the layer interface. Again the ring for (032) normals in FIG. 11D is much narrower than that in FIG. 11C, which indicates better orientation of PEO lamellae parallel to the layer interfaces.

The crystal orientation of PEO in confined nanolayers essentially reproduced the crystal structure reported in self-assembled PEO blocks in PS-b-PEO diblock copolymers. Comparing the sharpness of the WAXS pattern, higher orientation was achieved by physically confining a high molecular weight PEO between force-assembled layers than by confining a low molecular weight PEO block between self-assembled lamellae with covalent links. When the thickness confinement occurred on the size scale of the usual lamellar thickness, the PEO layers crystallized as single lamellae with extremely large aspect ratio. It was suggested that the lamellae could be thought of as large, impermeable single crystals. This may be the first time that large polymer single crystals were obtained by melt processing.

The coextrusion process, which operates with polymers that are readily available, now makes it possible to fabricate nanolayered polymeric structures in quantities sufficient to probe the structure-property relationships of the unique morphologies resulting from nanoscale confinement. Polymer nanolayers can be incorporated into conventional polymeric films to utilize their unique properties in the design and execution of packaging strategies that address growing environmental and energy concerns.

SAXS analysis in FIG. 12 shows the 2-dimensional SAXS patterns of EAA/PEO films with 3,6 µm, 110 nm and 20 nm PEO layers where the incident X-ray beam was parallel to the normal direction (ND) and to the extrusion direction (ED). Because the SAXS patterns measured in the transverse direction (TD) were indistinguishable from those in the ED, only ED and ND patterns are presented in the following discussion. The intense meridional streak in the ED patterns was mainly associated with grazing incidence scattering. This scattering was found to veil weak scattering from the lamellae. For clarification, the equatorial and meridianal scattering profiles were extracted from the 2D patterns. The peak assignments were based on the peak positions of the PEO and EAA control films. Comparison of the various scattering profiles indicated that the first-order peak positions of the PEO and EAA lamellae in coextruded EAA/PEO films remained nearly the same as in the control films. The long periods, $L_p=2\pi/q$, for PEO and EAA lamellae obtained from the SAXS measurements were 22±0.6 nm and 10.8±0.5 nm, respectively. The long period of PEO was consistent with literature reports for this molecular weight.

The ND and ED profiles from 3.6 µm PEO layers showed almost the same peak sharpness and height as the PEO control implying that the PEO layers were too thick for PEO lamellae to feel any significant confinement effect. The slight increase in the meridianal intensity over the equatorial intensity in the ND patterns was attributed to the melt flow during coextrusion.

As the PEO layer thickness decreased to 110 nm and 20 nm, however, highly oriented scattering features of the PEO lamellae appeared. These were due to the spatial confinement, not to a mechanical flow effect. The scattering peak of PEO lamellae in the EO meridianal pattern was much stronger and sharper than in the ED equatorial pattern, where it was barely discernable. Also, no first-order peak maximum for the PEO lamellae was discerned in the ND patterns. These scattering features implied that large-scale, oriented structures with the main scattering vector normal to the layer formed in the PEO layers. This was evidence that PEO lamellae were oriented primarily parallel to the layer surface. Crystallization as in-plane lamellae was due to the narrow confinement in the EAA layer interstices. The well-oriented in-plane lamellae were not detected when the X-ray beam was parallel to the ND since this direction was along the projection direction of the lamellar stacks. The in-plane lamellae were totally different from the individual lamellae of a shish-kebab or a spherulite, which have only one growth face. Rather, they were more like single crystals.

Scattering from the 20 nm PEO layers was only detected on the meridian with the X-ray beam parallel to the ED. This implied a single population of in-plane lamellae that had grown in the direction parallel to the PEO layers. It was also noted that the first order peak maxima in the SAXS pattern from 20 nm layers was much weaker than that from 110 nm layers. If the lamellae were uncorrelated within the PEO layers, they should not show a first-order peak maximum in the SAXS pattern, and rather, should exhibit only single lamellar scattering features. Thus, it was thought that the observed weak lamellar correlation peak from 20 nm PEO layers was associated with the thickness distribution of the layers, which occasionally enabled formation of two single crystals in a single PEO layer.

In contrast to the high degree of lamellar orientation in the PEO layers, the broad EAA first order SAXS reflection appeared in the ED and TD patterns with only a slight meridianal concentration, which was especially evident in the ND profiles. The slight residual orientation of the EAA lamellae was attributed to the melt flow during eoextrusion.

WAXS patterns from EAA and PEO films confirmed that EAA had the orthorhombic crystal form of polyethylene, and PEO took the usual monoclinic crystal form. The WAXS patterns of EAA/PEO layered films are shown in FIG. 13. Because the WAXS patterns measured in the TD were indistinguishable from those in the ED, only ED and ND patterns are presented here, The EAA (110) reflection (scattering angle $2\theta=21.5°$), and the PEO (120) reflection ($2\theta=19.2°$) and (032) reflection ($2\theta=23.3°$) appear in the WAXS patterns (The PEO reflection labeled (032) actually contains reflections from a group of planes which have similar d-spacing. A detailed assignment can be found in L. Zhu, et. al. J. Am. Chem. Soc. 122, 5957-5967 (2000)). The EAA (200) reflection ($2\theta=23.6°$), which was seen in the EAA pattern, was superimposed on the stronger PEO (032) reflection. The ND and TD patterns from the coextruded films with 3.6 µm-thick PEO layers exhibited almost isotropic rings for reflections from both the PEO and the EAA layers, FIG. 13A.

The ED pattern from the film with 110 nm PEO layers (FIG. 13B) revealed considerable orientation of the PEO. The PEO (120) reflections appeared as equatorial arcs and the PEO (032) reflections as arcs at approximately +65° and −65° with respect to the vertical direction. In addition, the (224) and (024) reflections appeared at +45° and −45° with respect to the vertical direction. Decreasing the PEO layer thickness to 20 nm sharpened the arcs in the ED pattern to spots, FIG. 13C. The ED pattern resembled the PEO fiber pattern (Y. Takahashi, H. Tadokoro, Macromolecules 6,672-675 (1973)) and indicated that the c-axis of the PEO crystals was oriented along the ND, i.e. vertical to the layer plane.

The ND patterns from the 110 nm and 20 nm PEO layers showed strong scattering at all angles, suggesting that the lamellae were essentially randomly oriented in the layer plane. In contrast to the high degree of orientation in the PEO layers, the EAA (110) reflection appeared as an almost isotropic ring in the ED patterns with only a slight equatorial concentration in the ND pattern due to slight orientation of the EAA chains in the extrusion direction. No other specific orientation of the EAA crystallographic planes was observed, although the BAA layers in these two samples were less than 400 nm thick. It was highly unlikely that the slight residual orientation of EAA from the extrusion process affected the oxygen permeability.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. All patents, publications, and references cited herein are incorporated by reference in their entirety.

Having described the invention, the following is claimed:

1. A multilayer film comprising a first polymer layer comprising polyethylene oxide coextruded with and confined between second polymer layers comprising ethylene-co-acrylic acid, the first polymer layer having a thickness under confinement of the second polymer layers that provides the first polymer layer with high aspect ratio substantially crystalline lamellae, the high aspect ratio substantially crystalline lamellae having an aspect ratio of at least about 5, the multilayer film being selective to the diffusion of gases therethrough.

2. The multilayer film of claim 1, the high aspect ratio substantially crystalline lamellae extending in a plane parallel to the first layer and the opposite second layers.

3. The multilayer film of claim 1, the first polymer layer having an average thickness of about 10 nm to about 500 nm.

4. The multilayer film of claim 1, comprising a plurality of extruded first polymer layers confined between a plurality of second polymer layers.

5. The multilayer film of claim 1, the second polymer layer being immiscible or partially miscible with the first polymer layer.

6. The multilayer film of claim 1, the high aspect ratio substantially crystalline lamellae having an aspect ratio of at least about 120.

7. The multilayer film of claim 1, the second polymer layers having a higher melting point than the first polymer layer.

8. A multilayer film comprising a plurality of extruded first polymer layers comprising polyethylene oxide and a plurality of extruded second polymer layers comprising ethylene-co-acrylic acid, each first polymer layer being confined between second polymer layers, each first polymer layer having a thickness that provides high aspect ratio substantially crystalline lamellae, the high aspect ratio substantially crystalline lamellae having an aspect ratio of at least about 5, the multilayer film being selective to the diffusion of gases therethrough.

9. The multilayer film of claim 8, the high aspect ratio substantially crystalline lamellae extending in a plane parallel to the plurality of extruded first polymer layers and the plurality of extruded second polymer layers.

10. The multilayer film of claim 8, each first polymer layer having an average thickness of about 10 nm to about 500 nm.

11. The multilayer film of claim 8, the plurality of extruded second polymer layers being immiscible or partially miscible with the plurality of extruded first polymer layers.

12. The multilayer film of claim 8, the high aspect ratio substantially crystalline lamellae having an aspect ratio of at least about 120.

13. The multilayer film of claim 8, the plurality of extruded second polymer layers having a higher melting point than the plurality of extruded first polymer layers.

14. A method of forming a confined crystallization multilayer film, the method comprising:

coextruding a plurality of first polymer layers comprising polyethylene oxide and a plurality of second polymer layers comprising ethylene-co-acrylic acid so that each first polymer layer is sandwiched between second polymer layers, each first polymer layer comprising a high aspect ratio substantially crystalline lamellae, the high aspect ratio substantially crystalline lamellae having an aspect ratio of at least about 5, the multilayer film being selective to diffusion of gases therethrough.

15. The method of claim 14, the high aspect ratio substantially crystalline lamellae extending in a plane parallel to the plurality of first polymer layers and the plurality of second polymer layers.

16. The method of claim 14, each first polymer layer having an average thickness of about 10 nm to about 500 nm.

17. The method of claim 14, the plurality of second polymer layers being immiscible or partially miscible with the plurality of first polymer layers.

18. A multilayer food packaging film comprising:
a first polymer layer comprising polyethylene oxide coextruded with and confined between second polymer layers comprising ethylene-co-acrylic acid, the first polymer layer having a thickness that provides the first polymer layer with high aspect ratio crystalline lamellae, the crystalline lamellae having an aspect ratio of at least about 5, the first polymer layer having a lower melting point than the second polymer layers, the multilayer food packaging film for enclosing food and being selective to the diffusion of gases there through.

* * * * *